(12) United States Patent
Lee et al.

(10) Patent No.: US 11,900,246 B2
(45) Date of Patent: Feb. 13, 2024

(54) METHOD AND APPARATUS FOR RECOGNIZING USER BASED ON ON-DEVICE TRAINING

(71) Applicant: Samsung Electronics Co., Ltd., Suwon-si (KR)

(72) Inventors: Dohwan Lee, Suwon-si (KR); Kyuhong Kim, Seoul (KR); Jaejoon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 594 days.

(21) Appl. No.: 16/914,671

(22) Filed: Jun. 29, 2020

(65) Prior Publication Data

US 2021/0064923 A1 Mar. 4, 2021

(30) Foreign Application Priority Data

Sep. 2, 2019 (KR) .................. 10-2019-0108199
Oct. 14, 2019 (KR) .................. 10-2019-0127239

(51) Int. Cl.
*G06N 3/08* (2023.01)
*G06V 10/82* (2022.01)
(Continued)

(52) U.S. Cl.
CPC .............. *G06N 3/08* (2013.01); *G06F 18/214* (2023.01); *G06F 18/23213* (2023.01);
(Continued)

(58) Field of Classification Search
CPC .......... G06N 3/08; G06N 3/044; G06N 3/045; G06F 21/30; G06F 21/31; G06F 21/32;
(Continued)

(56) References Cited

U.S. PATENT DOCUMENTS

2015/0356974 A1 12/2015 Tani et al.
2016/0086078 A1* 3/2016 Ji .................. G06V 30/19173
382/157

(Continued)

FOREIGN PATENT DOCUMENTS

JP 5155943 B2 3/2013
KR 10-1113770 B1 3/2012
(Continued)

OTHER PUBLICATIONS

Extended European Search Report dated Feb. 25, 2021 issued in counterpart European Patent Application No. 20192864.5 (12 pages in English).
(Continued)

*Primary Examiner* — Kenny A Cese
(74) *Attorney, Agent, or Firm* — NSIP Law

(57) ABSTRACT

An on-device training-based user recognition method includes performing on-device training on a feature extractor based on reference data corresponding to generalized users and user data, determining a registration feature vector based on an output from the feature extractor in response to the input of the user data, determining a test feature vector based on an output from the feature extractor in response to an input of test data, and performing user recognition on a test user based on a result of comparing the registration feature vector to the test feature vector.

19 Claims, 13 Drawing Sheets

(51) Int. Cl.
  *G06V 40/16*    (2022.01)
  *G06F 18/40*    (2023.01)
  *G06F 18/214*   (2023.01)
  *G06F 18/2413*  (2023.01)
  *G06F 18/23213* (2023.01)

(52) U.S. Cl.
  CPC .......... *G06F 18/2413* (2023.01); *G06F 18/41* (2023.01); *G06V 10/82* (2022.01); *G06V 40/168* (2022.01)

(58) Field of Classification Search
  CPC ........ G06F 18/22; G06F 18/41; G06F 18/214; G06F 18/2413; G06F 18/23213; G06V 10/82; G06V 40/168
  USPC ..... 706/25, 20; 382/155–160, 165, 170, 181
  See application file for complete search history.

(56) References Cited

U.S. PATENT DOCUMENTS

| | | | |
|---|---|---|---|
| 2017/0069327 A1 | 3/2017 | Heigold et al. | |
| 2017/0133006 A1 | 5/2017 | Lee et al. | |
| 2018/0157916 A1* | 6/2018 | Doumbouya | G06V 40/103 |
| 2019/0019500 A1 | 1/2019 | Jang et al. | |
| 2019/0147227 A1* | 5/2019 | Ko | G06T 5/50 382/118 |
| 2019/0156837 A1* | 5/2019 | Park | G10L 17/00 |
| 2019/0332851 A1* | 10/2019 | Han | G06V 40/172 |
| 2020/0211566 A1* | 7/2020 | Kang | G10L 17/04 |

FOREIGN PATENT DOCUMENTS

| | | | | |
|---|---|---|---|---|
| WO | WO 2018/049313 A1 | 3/2018 | | |
| WO | WO-2018049313 A1 * | 3/2018 | ............... | G06N 3/04 |

OTHER PUBLICATIONS

Osia, Seyed Ali, et al. "A Hybrid Deep Learning Architecture for Privacy-Preserving Mobile Analytics." IEEE Internet of Things Journal 7.5 (2020): 4505-4518 (12 pages in English).

Lu, Chris Xiaoxuan, et al. "Autonomous Learning for Face Recognition in the Wild via Ambient Wireless Cues." The World Wide Web Conference. 2019 (11 pages in English).

Li, Lei, et al. "An Original Face Anti-spoofing Approach using Partial Convolutional Neural Network." 2016 Sixth International Conference on Image Processing Theory, Tools and Applications (IPTA). IEEE, 2016 (6 pages in English).

Konecny et al., "Federated Learning: Strategies for Improving Communication Efficiency," Oct. 30, 2017, Work performed while also affiliated with University of Edinburgh, 10 pages.

Kamnitsas et al., "Semi-Supervised Learning via Compact Latent Space Clustering," Jul. 29, 2018, 10 pages.

McMahan et al., "Federated Learning: Collaborative Machine Learning without Centralized Training Data," Google AI Blog, Apr. 6, 2017, https://ai.googleblog.com/2017/04/federated-learning-collaborative.html, 4 pages.

Duh, "Incorporating Knowledge Bases into Deep Learning," Microsoft Research CORE9 Project Summary Booklet, pp. 9-11.

Yu et al., "A Novel Multimodal Deep Neural Network Framework for Extending Knowledge Base," ISSN 2007-9737, Computing and Systems, vol. 20, No. 3, 2016, pp. 459-466.

Snell et al., "Prototypical Networks for Few-shot Learning," 31st Conference on Neural Information Processing Systems (NIPS 2017), Long Beach, CA, USA, 11 pages.

* cited by examiner

FIG. 8
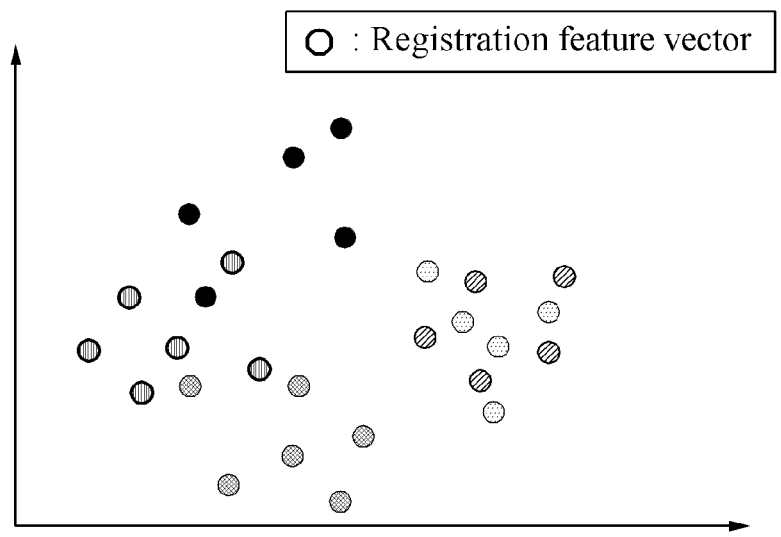
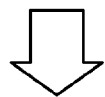
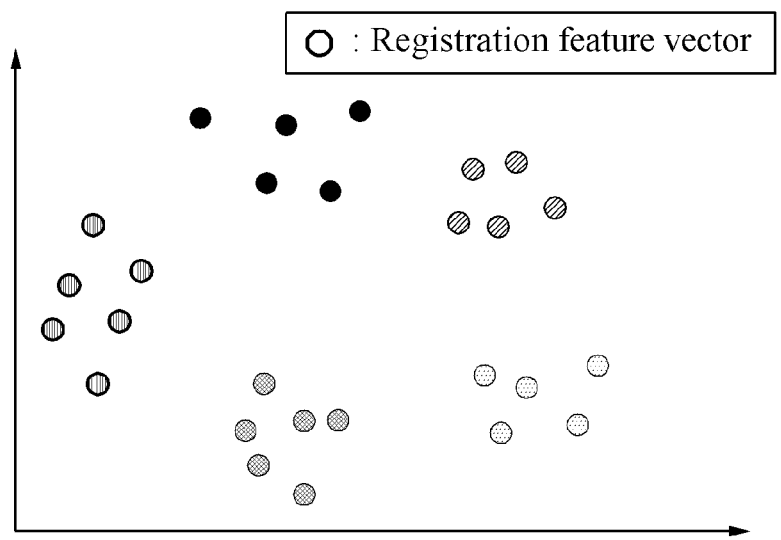

FIG. 9
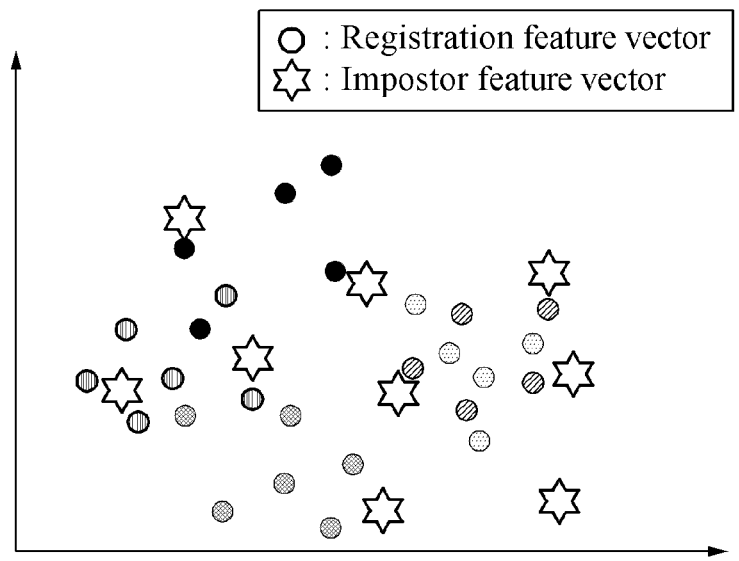
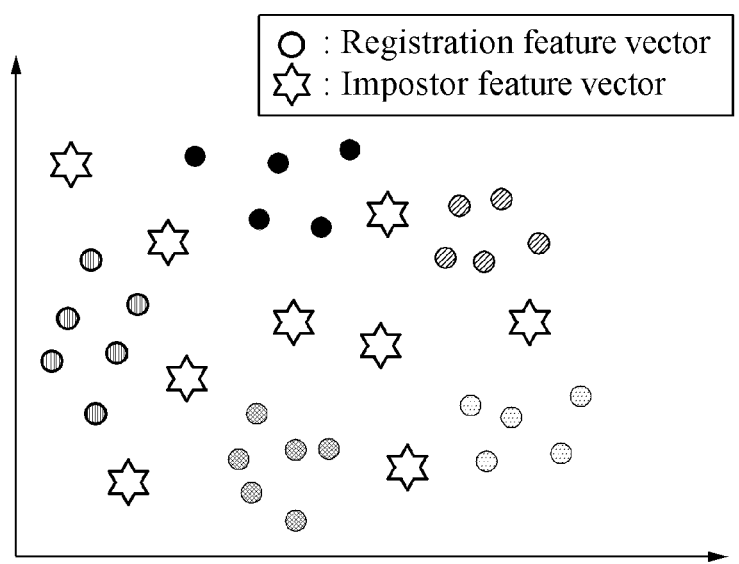

METHOD AND APPARATUS FOR RECOGNIZING USER BASED ON ON-DEVICE TRAINING

CROSS-REFERENCE TO RELATED APPLICATIONS

This application claims the benefit under 35 USC 119(a) of Korean Patent Application No. 10-2019-0108199 filed on Sep. 2, 2019, and Korean Patent Application No. 10-2019-0127239 filed on Oct. 14, 2019, in the Korean Intellectual Property Office, the entire disclosures of which are incorporated herein by reference for all purposes.

BACKGROUND

1. Field

The following description relates to an on-device training-based user recognition method and apparatus.

2. Description of Related Art

A technological automation of recognition, for example, has been implemented through processor implemented neural network models, as specialized computational architectures, that after substantial training may provide computationally intuitive mappings between input patterns and output patterns. The trained capability of generating such mappings may be referred to as a learning capability of the neural network. Further, because of the specialized training, such specially trained neural network may thereby have a generalization capability of generating a relatively accurate output with respect to an input pattern that the neural network may not have been trained for, for example.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a recognition method includes receiving user data input by a valid user for user registration, performing on-device training on a feature extractor based on the user data and reference data corresponding to generalized users, determining a registration feature vector based on an output from the feature extractor in response to the input of the user data, receiving test data input by a test user for user recognition, determining a test feature vector based on an output from the feature extractor in response to the input of the test data, and performing the user recognition on the test user based on a result of comparing the registration feature vector and the test feature vector.

The feature extractor may include a first neural network having a set parameter, and a second neural network having an adjustable parameter. The adjustable parameter of the second neural network may be adjusted by the on-device training. The first neural network may be pretrained to extract a feature from input data based on a large user database (DB). The performing of the on-device training may include allocating labels of different values to the user data and the reference data, respectively, and performing the on-device training based on a result of comparing the labels and outputs from the feature extractor in response to inputs of the user data and the reference data.

The feature extractor may include a first neural network having a set parameter, and a second neural network having an adjustable parameter. The performing of the on-device training may include inputting the user data to the first neural network, inputting, to the second neural network, the reference data and an output from the first neural network in response to the input of the user data, and performing the on-device training based on an output from the second neural network. The reference data may include generalized feature vectors corresponding to the generalized users. The generalized feature vectors may be generated by grouping feature vectors corresponding to a plurality of generalized users into clusters.

The performing of the user recognition may include performing the user recognition based on a result of comparing a distance between the registration feature vector and the test feature vector to a threshold value. The distance between the registration feature vector and the test feature vector may be determined based on one of a cosine distance between the registration feature vector and the test feature vector and a Euclidean distance between the registration feature vector and the test feature vector. When the registration feature vector is determined, the recognition method may further include storing the determined registration feature vector in a registered user DB.

In another general aspect, a recognition method includes obtaining a feature extractor including a first neural network having a set parameter and a second neural network having an adjustable parameter, performing on-device training on the feature extractor based on user data corresponding to a valid user and reference data corresponding to generalized users, and performing user recognition on test data using the feature extractor when the on-device training is completed.

In still another general aspect, an on-device training method for a feature extractor provided in a user device and including a first neural network pretrained and having a set parameter and a second neural network having an adjustable parameter, the on-device training method includes obtaining user data input by a valid user, inputting the user data to the first neural network, and adjusting the adjustable parameter of the second neural network by inputting, to the second neural network, preset reference data and an output from the first neural network in response to the input of the user data.

The reference data may include 1000 or fewer feature vectors, 500 or fewer feature vectors, or 100 or fewer feature vectors.

In another general aspect, a recognition apparatus includes a processor, and a memory including instructions executable in the processor. When the instructions are executed by the processor, the processor may be configured to receive user data input by a valid user for user registration, perform on-device training on a feature extractor based on the user data and reference data corresponding to generalized users, determine a registration feature vector based on an output from the feature extractor in response to the input of the user data, receiving test data input by a test user for user recognition, determine a test feature vector based on an output from the feature extractor in response to the input of the test data, and perform the user recognition on the test user based on a result of comparing the registration feature vector and the test feature vector.

In another general aspect, a recognition apparatus includes a processor, and a memory including instructions executable in the processor. When the instructions are executed by the processor, the processor may be configured to obtain a feature extractor including a first neural network having a set parameter and a second neural network having an adjustable parameter, perform on-device training on the feature extractor based on user data corresponding to a valid user and reference data corresponding to generalized users, and perform user recognition on test data using the feature extractor when the on-device training is completed.

In another general aspect, a method includes pretraining a first neural network of a feature extractor at a server end; after the first neural network is pretrained, providing the feature extractor to a device; training a second neural network of the feature extractor on the device using data input to the device; and performing user recognition on test data input to the device using the feature extractor.

The data input to the device may include user data input by a valid user for user registration and reference data corresponding to generalized users.

The method may include performing the user recognition by comparing a registration feature vector corresponding to the user data to a test feature vector corresponding to the test data.

Other features and aspects will be apparent from the following detailed description, the drawings, and the claims.

BRIEF DESCRIPTION OF THE DRAWINGS

FIGS. 8 and 9 are diagrams illustrating examples of a change in distribution of feature vectors based on on-device training.

Figure 1:
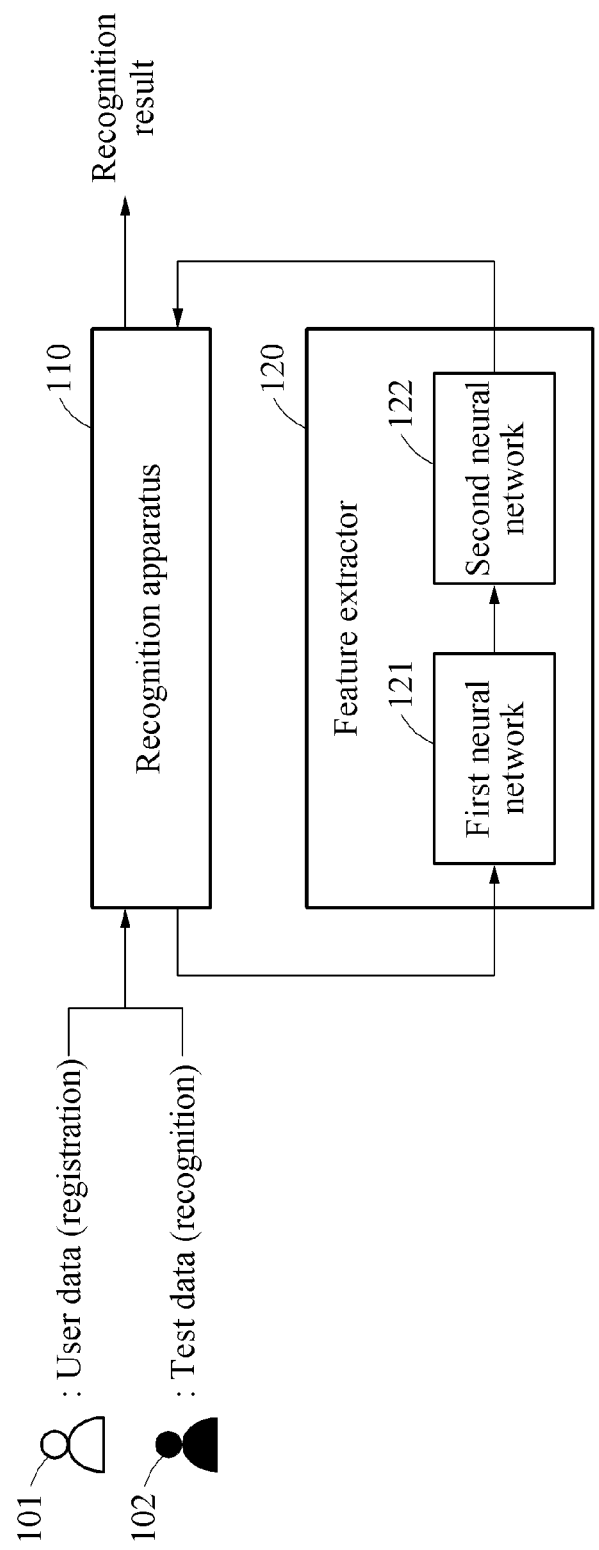
FIG. 1 is a diagram illustrating an example of an operation to be performed by a recognition apparatus for user registration and user recognition.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of the examples, detailed description of structures or functions that are thereby known after an understanding of the disclosure of the present application will be omitted when it is deemed that such description will cause ambiguous interpretation of the examples.

Hereinafter, examples will be described in detail with reference to the accompanying drawings, and like reference numerals in the drawings refer to like elements throughout.

FIG. 1 is a diagram illustrating an example of an operation to be performed by a recognition apparatus for user registration and user recognition. Referring to FIG. 1, a recognition apparatus 110 registers a valid user 101 in the recognition apparatus 110 based on user data of the valid user 101. The valid user 101 may be one or more users, and the one or more users may be registered in the recognition apparatus 110. The valid user 101 may be a person who has a right to use the recognition apparatus 110, for example, an owner or a manager of a device in which the recognition apparatus 110 is provided or embedded. The valid user 101 may also be referred to as a genuine user. The registering of the valid user 101 in the recognition apparatus 110 may be referred to herein as a user registration process. Through the user registration process, identification information, for example, a registration feature vector, of the valid user 101 may be stored in the recognition apparatus 110 or another apparatus or device associated with the recognition apparatus 110. When the valid user 101 is registered through the user registration process, the valid user 101 may then be referred to as a registered user.

A test user 102 may be an unidentified person who is not identified yet, and attempts user recognition through the recognition apparatus 110 to use the recognition apparatus 110. The test user 102 may be the valid user 101, or an impostor which indicates a person who does not have a right to use the recognition apparatus 110. The recognition apparatus 110 may perform the user recognition on the test user 102 by comparing test data of the test user 102 and the user data. The performing of the user recognition on the test user 102 may be referred to herein as a user recognition process. The user recognition process may be performed after the user registration process is performed.

The user recognition may include user verification and user identification. The user verification may be performed to determine whether the test user 102 is a registered user or not, and the user identification may be performed to determine which one of a plurality of users is the test user 102. For example, when there is a plurality of registered users, and the test user 102 is one of the registered users, the user identification may be performed to determine the one registered user corresponding to the test user 102.

A result of the user recognition (herein simply referred to as "recognition result") may include at least one of a result of the user verification (verification result) or a result of the user identification (identification result). For example, when the test user 102 is a registered user, the recognition apparatus 110 may output a verification result corresponding to a successful recognition. In this example, when there is a plurality of registered users, a recognition result may include an identification result indicating which one of the registered users corresponds to the test user 102. However, when the test user 102 is an impostor, the recognition apparatus 110 may output a verification result corresponding to an unsuccessful recognition.

The user data may be associated with the valid user 101, and the test data may be associated with the test user 102. The user data may be input to the recognition apparatus 110 by the valid user 101, input to another apparatus or device including the recognition apparatus 110 to be transferred to the recognition apparatus 110, or input to another apparatus or device separate from the recognition apparatus 110 to be transferred to the recognition apparatus 110. Similarly, the test data may be input to the recognition apparatus 110 by the test user 102, input to another apparatus or device including the recognition apparatus 110 to be transferred to the recognition apparatus 110, or input to another apparatus or device separate from the recognition apparatus 110 to be transferred to the recognition apparatus 110.

Data that is input to the recognition apparatus 110, such as the user data and the test data, may be referred to as input data. The input data may include a voice or an image. For example, in a case of speaker recognition, the input data may include a speech, a voice, or an audio. In a case of facial recognition, the input data may include a face image. In a case of fingerprint recognition, the input data may include a fingerprint image. In a case of iris recognition, the input data may include an iris image. The recognition apparatus 110 may perform the user verification based on at least one of such various verification methods. A modality of each of the user data, the test data, reference data, and training data may correspond to at least one verification method used by the recognition apparatus 110. Hereinafter, examples will be described in relation to speaker recognition for convenience of description. However, the examples may also be applied to other verification methods in addition to the speaker recognition.

The recognition apparatus 110 may perform the user recognition using a feature extractor 120. The feature extractor 120 includes a neural network, for example, a first neural network 121 and a second neural network 122. At least a portion of the neural network may be embodied by software, hardware including a neural processor, or a combination thereof. The neural network may be, for example, a deep neural network (DNN) including, for example, a fully connected network, a deep convolutional network, and a recurrent neural network (RNN). The DNN may include a plurality of layers which includes an input layer, at least one hidden layer, and an output layer.

The neural network may be trained to perform a given operation by mapping input data and output data which are in a nonlinear relationship based on deep learning. The deep learning may be a type of machine learning to be performed to solve a given issue from a big data set. The deep learning may be construed as being an optimization process to find a point at which energy is minimized. Through supervised or unsupervised learning of the deep learning, a weight corresponding to an architecture or a model of the neural network may be obtained, and the input data and the output data may be mapped to each other through the weight obtained as described in the foregoing. Although the feature extractor 120 is illustrated in FIG. 1 as being located outside the recognition apparatus 110, the feature extractor 120 may be located inside the recognition apparatus 110.

The recognition apparatus 110 may input the input data to the feature extractor 120, and register a user in the recognition apparatus 110 or generate a recognition result based on an output from the feature extractor 120 in response to the input of the input data. In an example, the recognition apparatus 110 may apply preprocessing to the input data and input, to the feature extractor 120, the input data obtained by applying the preprocessing. Through the preprocessing, the input data may be changed to a form suitable for the feature extractor 120 to extract a feature therefrom. For example, when the input data corresponds to an audio wave, the audio wave may be converted to a frequency spectrum through the preprocessing.

The feature extractor 120 may output the output data in response to the input of the input data. The output data of the feature extractor 120 may be referred to herein as a feature vector. Alternatively, the output data of the feature extractor 120 may also be referred to as an embedding vector indicating that the output data includes identification information of a user. In the user registration process for the valid user 101, the feature extractor 120 may output a feature vector in response to the input of the user data. The output feature vector may be referred to herein as a registration feature vector, and stored as identification information of the valid user 101 in the recognition apparatus 110 or another apparatus or device associated with the recognition apparatus 110. In the user recognition process for the test user 102, the feature extractor 120 may output a feature vector in response to the input of the test data. The output feature vector may be referred to herein as a test feature vector.

The recognition apparatus 110 may generate a recognition result by comparing the registration feature vector and the test feature vector. For example, the recognition apparatus 110 may determine a distance between the registration feature vector and the test vector, and generate the recognition result based on a result of comparing the determined distance to a threshold value. In this example, when the determined distance is less than the threshold value, the registration feature vector and the test feature vector may be represented as being matched to each other.

For example, when there is a plurality of registered users, there may be a plurality of registration feature vectors for each of the registered users. In this example, the recognition apparatus 110 may generate a recognition result by comparing a test feature vector to each of the registration feature vectors. When the test feature vector matches one of the registration feature vectors, the recognition apparatus 110 may output a recognition result corresponding to a successful recognition. The recognition result may include an identification result associated with a registered user corresponding to the registration feature vector that matches the test feature vector. For example, the recognition result may include an identification result associated with one of the registered users corresponding to the test user 102.

The feature extractor 120 includes the first neural network 121 and the second neural network 122. The first neural network 121 may be pretrained or trained in advance based on a large user database (DB), and the second neural network 122 may be trained additionally based on user data in the user registration process. Here, the term "pre-" or "in advance" may indicate a point in time before the user registration process is performed, for example, a point in time of development and production of the feature extractor 120. The large user DB may correspond to non-specific general users, and user data may correspond to a specific user, for example, the valid user 101. In an example, training of the first neural network 121 may be performed by a server in a step of development and production of the feature extractor 120, and be referred to as pretraining or first training. In addition, training of the second neural network 122 may be performed by an apparatus or device including the recognition apparatus 110 in the user registration process, and be referred to as on-device training or second training. Here, a "device" in the term "on-device training" may indicate a user device in which the recognition apparatus 110 is provided or embedded.

The first neural network 121 may have a set parameter, and the second neural network 122 may have an adjustable parameter. A parameter used herein may include a weight. When the first neural network 121 is trained through the pretraining, the parameter of the first neural network 121 may be set, and not be changed by the on-device training.

The parameter being set may also be described as the parameter being frozen, and the set parameter may also be referred to as a frozen parameter. The parameter of the second neural network 122 may be adjusted by the on-device training. The first neural network 121 may extract a feature from input data in a general way, and the second neural network 122 may remap the feature extracted by the first neural network 121 such that the feature is specific to a user of an individual device.

In user recognition, a mismatch between training data and actual user data may result in poor recognition performance. For example, the actual user data may not be used for the pretraining of the first neural network 121, and thus a level of recognition performance of the feature extractor 120 including only the first neural network 121 may not be satisfactory. However, in this example, the on-device training of the second neural network 122 may be performed based on the actual user data, and thus may help reduce such mismatch. For example, when a general feature extractor to which only pretraining is applied is used, it may not be easy to identify users having similar features, for example, family members. However, when the feature extractor 120 described herein is used, actual user data of each of the users may be used for the on-device training, and thus the users having similar features may be relatively accurately identified.

In addition, for the on-device training, reference data corresponding to generalized users may be used in addition to user data. Through the on-device training using the user data and the reference data, the feature extractor 120 may extract a feature from the user data that is distinguishable from that in the reference data. Thus, it is possible to more accurately identify a feature vector of an impostor and a feature vector of a registered user, thereby improving recognition performance. The on-device training using user data and reference data will be described in greater detail hereinafter.

Figure 2:
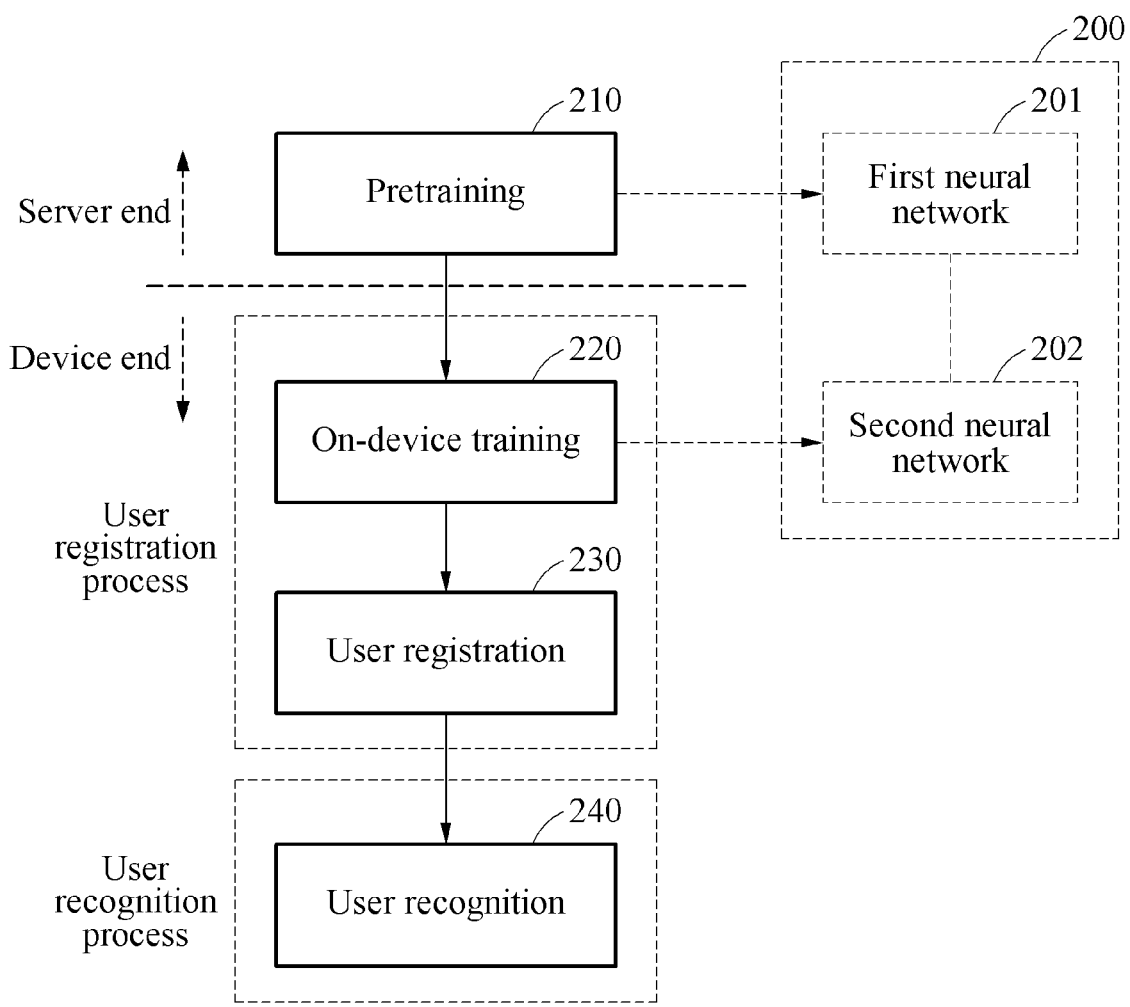
FIG. 2 is a diagram illustrating an example of processes to be performed for pretraining, user registration, and user recognition.

FIG. 2 is a diagram illustrating an example of processes to be performed for pretraining, user registration, and user recognition. Referring to FIG. 2, in operation 210, pretraining is performed. The pretraining may be performed based on a large user DB corresponding to non-specific general users. Through the pretraining, a first neural network 201 of a feature extractor 200 may be trained. The pretraining may be performed at a server end. After operation 210 is performed, the feature extractor 200 may be provided or embedded in a device and distributed to a user.

In operation 220, when user data is input by a valid user for user registration, on-device training is performed. In operation 230, the user registration is performed. Operations 220 and 230 may be collectively referred to as a user registration process. The on-device training may be performed in the user registration process. The on-device training may be performed based on user data corresponding to a specific user, for example, the valid user, and reference data corresponding to generalized users. Through the on-device training, a second neural network 202 of the feature extractor 200 is trained. Before the on-device training is performed, the second neural network 202 may be initialized by an identity matrix.

After operation 220 is performed, the feature extractor 200 may become specific to a registered user. In operation 230, after the on-device training is completed, user data of the valid user is input to the feature extractor 200. A registration feature vector is determined based on an output from the feature extractor 200 that responds to the input of the user data. When the registration feature vector is determined, the determined registration feature vector is stored in a registered user DB.

In operation 240, user recognition is performed. Here, operation 240 may be referred to as a user recognition process. In this operation, test data input by a test user for the user recognition is input to the feature extractor 200, and a test feature vector is determined based on an output of the feature extractor 200 that responds to the input of the test data. The user recognition is performed on the test user based on a result of comparing the registration feature vector and the test feature vector. Operations 220 through 240 may be performed by the device.

Figure 3:
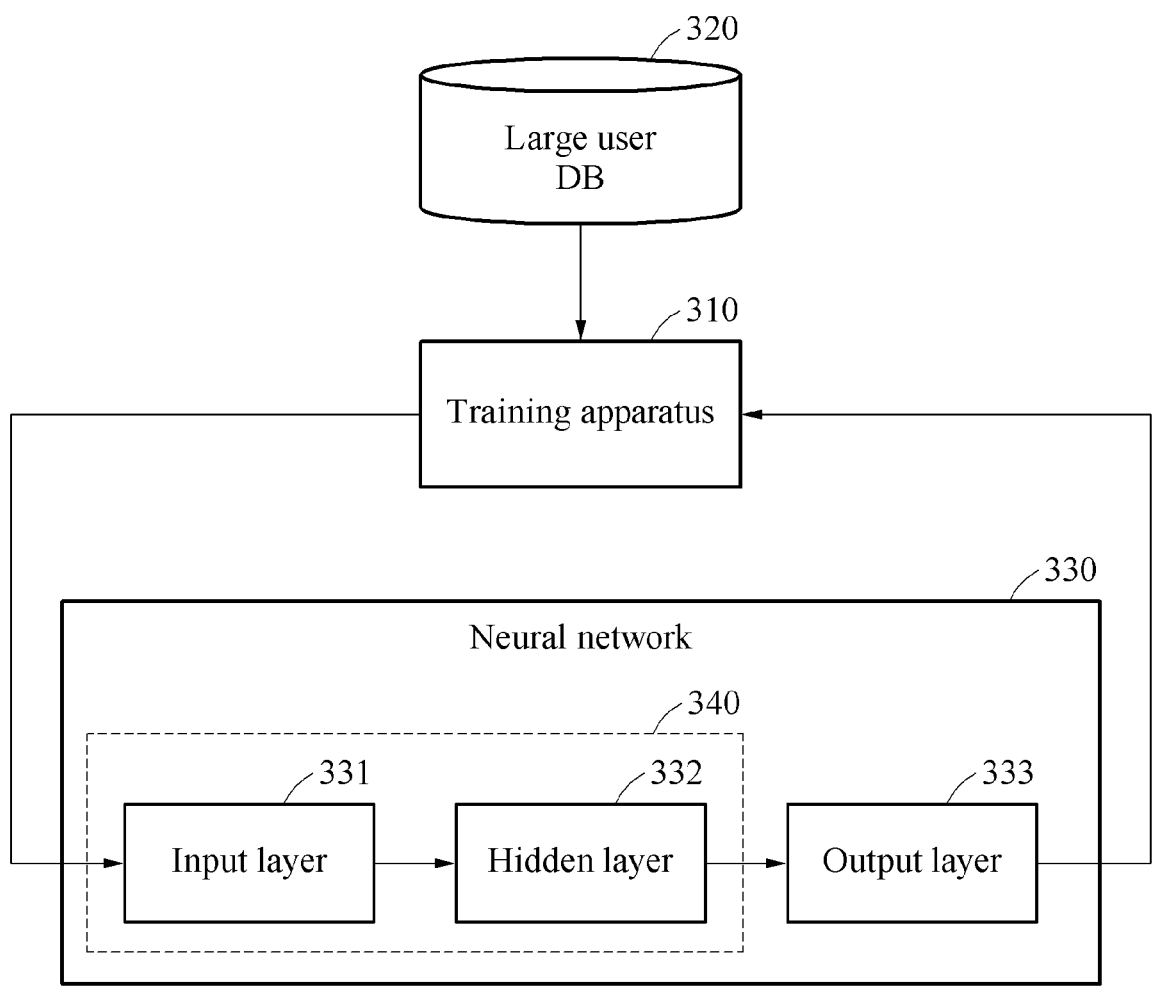
FIG. 3 is a diagram illustrating an example of pretraining.

FIG. 3 is a diagram illustrating an example of pretraining. Referring to FIG. 3, a training apparatus 310 trains a neural network 330 using a large user DB 320 to extract a feature from input data. For example, the large user DB 320 may include training data associated with a plurality of non-specific general users, and a label may be allocated to each set of training data. The training data may include a voice or an image. For example, in a case of speaker recognition, input data may include a speech, a voice, or an audio.

The neural network 330 includes an input layer 331, at least one hidden layer 332, and an output layer 333. For example, the input layer 331 may correspond to training data, and the output layer 333 may correspond to an activation function such as Softmax. Through pretraining of the neural network 330, a parameter, for example, a weight, of the hidden layer 332 may be adjusted. When allocating a label, different labels may be allocated to respective sets of training data. Through the pretraining based on the labels and the training data, the neural network 330 may be capable of outputting different sets of output data in response to different sets of input data. Such capability of the neural network 330 may be construed as a feature extraction function.

For example, a first label may be allocated to first training data and a second label may be allocated to second training data. In this example, the neural network 330 may respond to an input of the first training data and output first output data, and respond to an input of the second training data and output second output data. The training apparatus 310 may then compare the first output data and the first label, and adjust a parameter of the hidden layer 332 such that the first output data and the first label may become identical to each other. Similarly, the training apparatus 310 may compare the second output data and the second label, and adjust a parameter of the hidden layer 332 such that the second output data and the second label may become identical to each other. The training apparatus 310 may pretrain the neural network 330 by repeating such process described above based on the large user DB 320.

In an example, a training process may be performed by a unit of batch. For example, a process of inputting one set of training data to the neural network 330 and obtaining one set of output data corresponding to an output from the neural network 330 that responds to the input of the training data may be performed by a batch unit, and the pretraining using the large user DB 320 may be performed by repeating such process by a batch unit.

The output layer 333 may convert a feature vector output from the hidden layer 332 to a form corresponding to a label. Through the pretraining, a parameter of the hidden layer 332 may be set to be a value suitable for an objective of training, and the parameter of the hidden layer 332 may be set or fixed when the pretraining is completed. Subsequently, the output layer 333 may be removed from the neural network 330, and a first neural network of a feature extractor may be configured with a part 340 including the input layer 331 and the hidden layer 332.

When the pretraining is completed, the neural network 330 may perform a feature extraction function to output different sets of output data in response to different sets of input data. Such feature extraction function may exhibit maximal performance when training data is the same as actual data used in a user registration process and a user recognition process. However, the training data and the actual data may generally differ from each other. It is only theoretically possible to reduce a mismatch between the training data and the actual data by including the actual data in the training data and performing retraining in order to improve recognition performance.

However, training the neural network 330 with the large user DB 320 may be needed until the neural network 330 has the feature extraction function, and such training may require a massive computing resource. In general, a user device may have a limited computing resource, and thus such training may be performed at a massive server end. Thus, according to an example, there is provided a dual training method including pretraining and on-device training. The dual training method may generate a first neural network of a feature extractor by training the neural network 330 with the large user DB 320 and generate a second neural network of the feature extractor based on actual data. Thus, it is possible to reduce or minimize a mismatch between training data and actual data, and provide a feature extractor specific to a user device.

Figure 4:
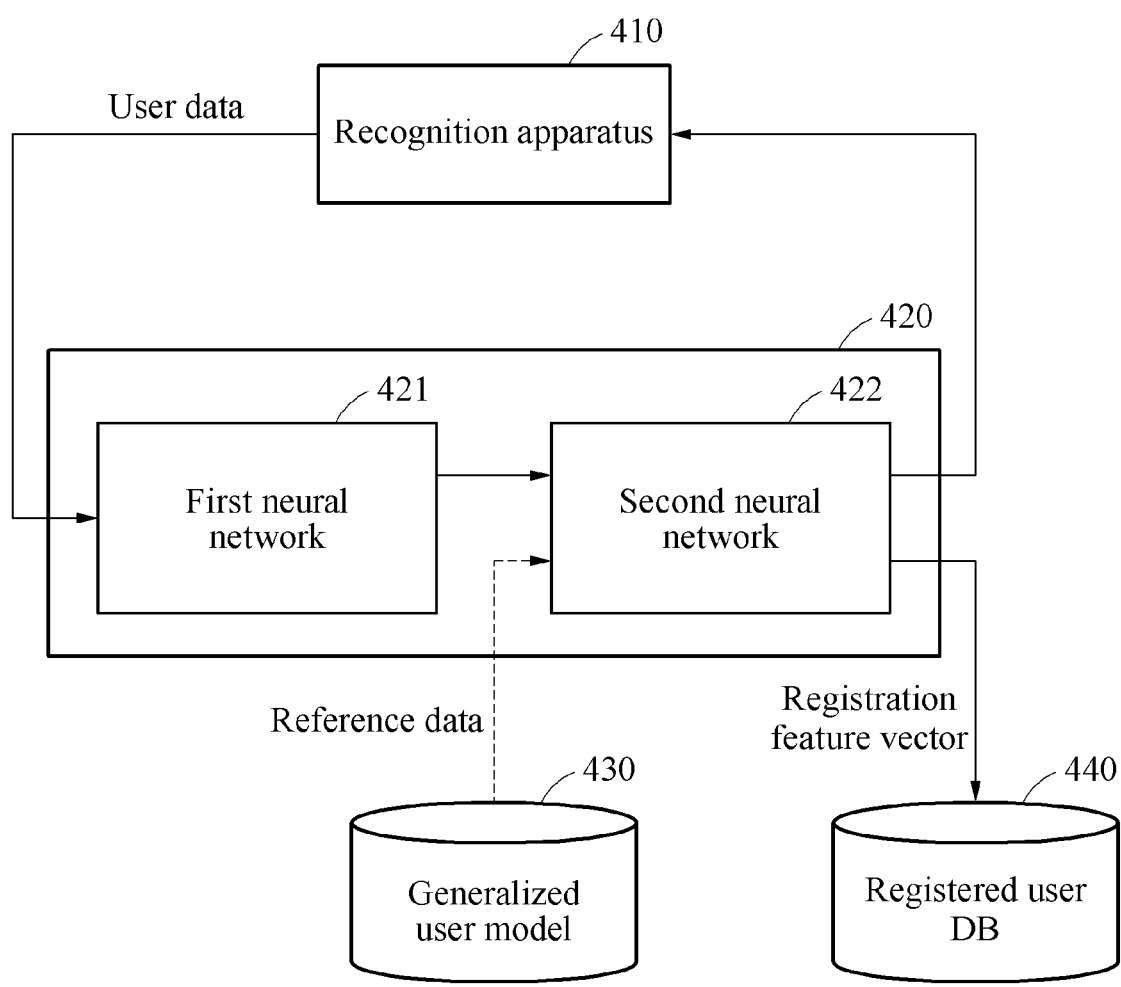
FIG. 4 is a diagram illustrating an example of an operation to be performed by a recognition apparatus for on-device training and user registration.

FIG. 4 is a diagram illustrating an example of an operation to be performed by a recognition apparatus for on-device training and user registration. Referring to FIG. 4, a valid user inputs user data for user registration. A recognition apparatus 410 performs on-device training on a feature extractor 420 based on the user data. The feature extractor 420 includes a first neural network 421 and a second neural network 422. A parameter of the first neural network 421 may be set or fixed by pretraining, and a parameter of the second neural network 422 may be adjusted by on-device training. For the on-device training, reference data may be used. The recognition apparatus 410 obtains the reference data from a generalized user model 430, and inputs the obtained reference data to the second neural network 422. The user data may correspond to the valid user, and the reference data may correspond to generalized users. The generalized user model 430 will be described in greater detail hereinafter.

The recognition apparatus 410 adjusts the parameter of the second neural network 422 by allocating different labels to each set of the user data and the reference data, and comparing the labels and outputs from the feature extractor 420 that respond to inputs of the user data and the reference data. As described above, the recognition apparatus 410 may train the feature extractor 420 such that the feature extractor 420 may output different feature vectors respectively corresponding to the user data and the reference data. By training the feature extractor 420 using the user data and the reference data, it is possible to more accurately identify registration feature vectors of registered users, and more accurately identify a registration feature vector of a registered user and a feature vector of an impostor. Thus, through the on-device training, the feature extractor 420 may have an identification capability to identify each of registered users, and a verification capability to distinguish a registered user and an impostor and verify the registered user.

When the on-device training is completed, the recognition apparatus 410 inputs the user data to the feature extractor 420, and obtains a feature vector output from the feature extractor 420 that responds to the input of the user data. The recognition apparatus 410 stores the feature vector output by the feature extractor 420 as a registration feature vector in a registered user DB 440. The registration feature vector may be used subsequently for a user recognition process.

Figure 5:
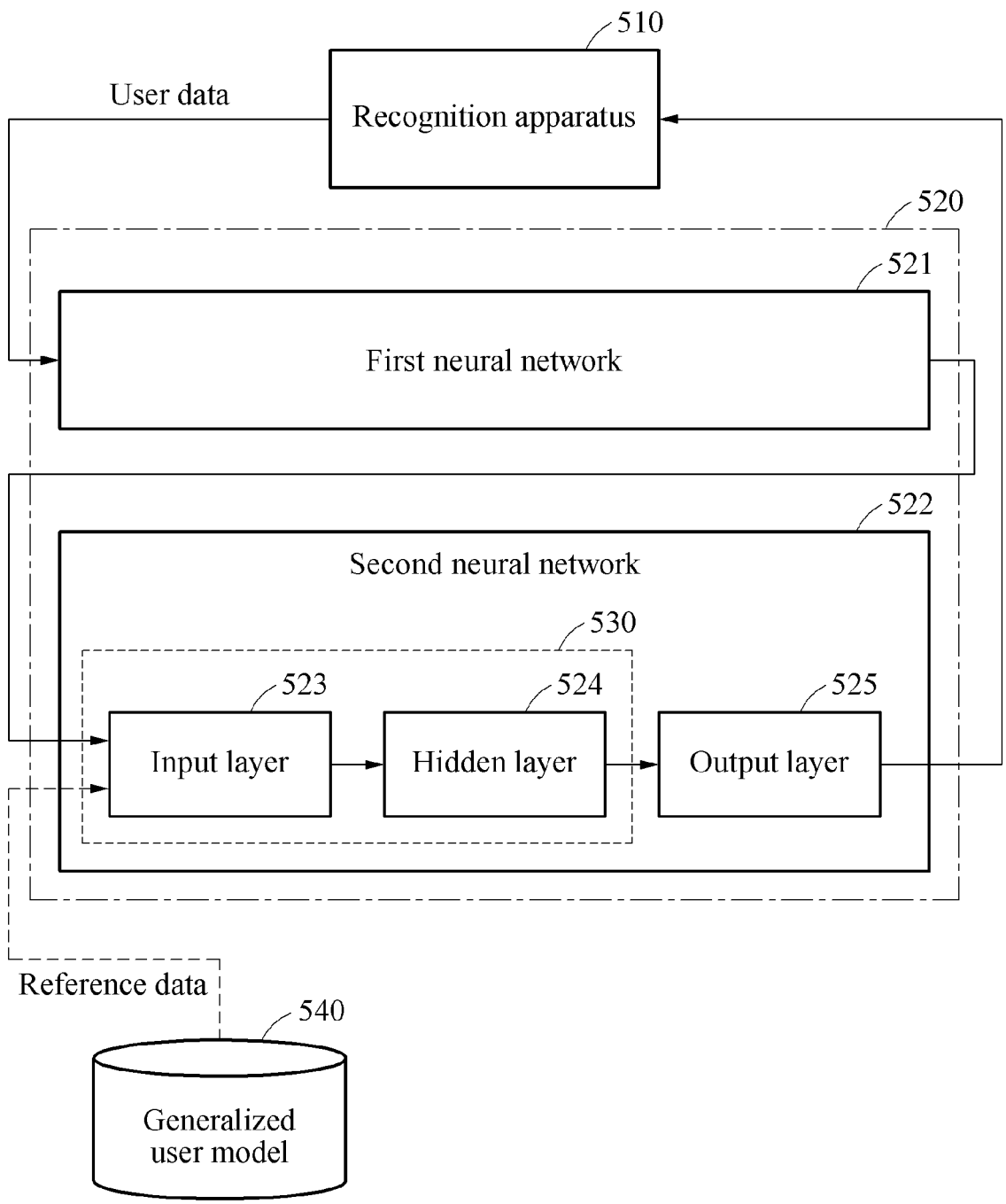
FIG. 5 is a diagram illustrating an example of on-device training.

FIG. 5 is a diagram illustrating an example of on-device training. Referring to FIG. 5, a recognition apparatus 510 performs on-device training on a feature extractor 520 using user data and reference data. The user data is input to a first neural network 521, and the reference data is input to a second neural network 522. The reference data is obtained from a generalized user model 540. The recognition apparatus 510 inputs the user data to the first neural network 521. When the first neural network 521 responds to the input of the user data and outputs a feature vector, the recognition apparatus 510 inputs the output feature vector to the second neural network 522. The reference data may be generated using a neural network configured to perform feature extraction, similarly to the first neural network 521. It may be construed that the output from the first neural network 521 is input to the second neural network 522 from the first neural network 521, without being controlled by the recognition apparatus 510.

The second neural network 522 may be trained through a similar process performed on the neural network 330 of FIG. 3. It may be construed that the training data of FIG. 3 is replaced with a feature vector corresponding to the user data and a reference vector in the example of FIG. 5. The second neural network 522 includes an input layer 523, at least one hidden layer 524, and an output layer 525. For example, the input layer 523 may correspond to input data including the feature vector corresponding to the user data and the reference data, and the output layer 525 may correspond to an activation function such as Softmax. A parameter, for example, a weight, of the hidden layer 524 may be adjusted through the on-device training. The second neural network 522 may be configured with a part 530 including the input layer 523 and the hidden layer 524.

To each set of the user data and the reference data, a label may be allocated. Through the on-device training based on the user data, the reference data, and the different labels allocated to respective sets of data, the feature extractor 520 may become capable of outputting different sets of output data in response to different sets of user data and reference data. For example, the first neural network 521 may extract a feature from input data in a general way, whereas the second neural network 522 may remap the feature extracted by the first neural network 521 such that the feature becomes specific to a user of an individual device.

In an example, a training process may be performed by a unit of batch. For example, a process of inputting one of user data and reference data to the feature extractor 520 and obtaining one set of output data corresponding to an output from the feature extractor 520 may be performed by a batch unit, and the on-device training using the user data and the reference data may be performed by repeating such process by a batch unit. When the on-device training is completed, the parameter of the hidden layer 524 may be set or fixed. Subsequently, the output layer 525 may be removed from the second neural network 522, and the second neural network 522 may be determined or settled with the output layer 525 being removed therefrom.

Through the on-device training as described above, it is possible to reduce or minimize a mismatch between training data and actual data. For example, it is possible to improve an identification capability to identify registration feature vectors through user data, and a verification capability to identify or distinguish a registration feature vector and a feature vector of an impostor through reference data.

Figure 6:
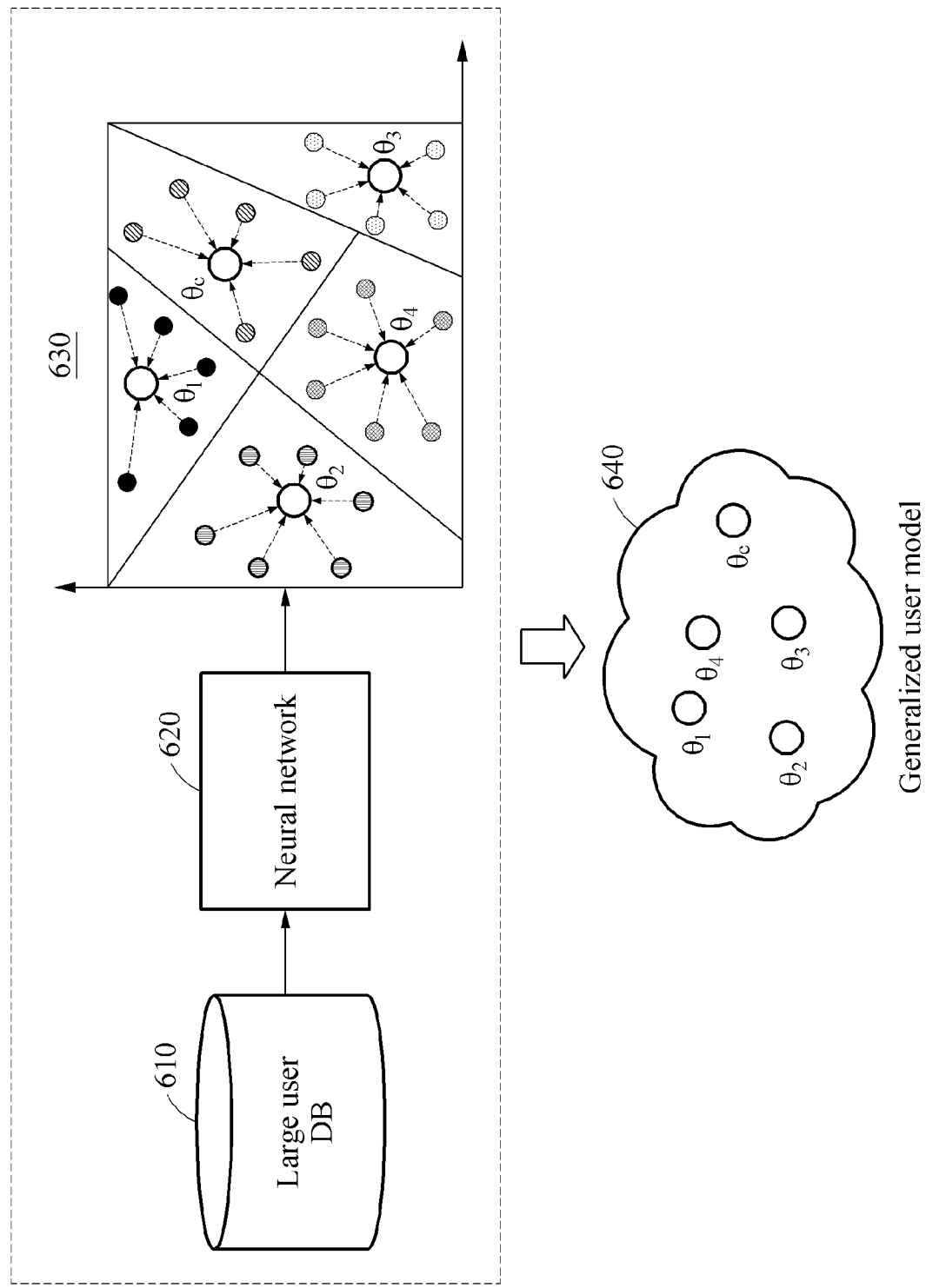
FIG. 6 is a diagram illustrating an example of generating a generalized user model.

FIG. 6 is a diagram illustrating an example of generating a generalized user model. Referring to FIG. 6, input data is extracted from a large user DB 610, and input to a neural network 620. For example, the neural network 620 may correspond to the first neural network 421 of FIG. 4, and output a feature vector based on the input data. The large user DB 610 may be identical to or different from the large user DB 320 of FIG. 3.

In the example of FIG. 6, feature vectors output by the neural network 620 are indicated by small circles on a vector plane 630. These feature vectors may correspond to a plurality of generalized users included in the large user DB 610, and be also referred to as basic feature vectors. As vectors representing the basic feature vectors, representative feature vectors, for example, $\theta_1, \theta_2, \ldots, \theta_c$, may be selected. For example, the representative feature vectors $\theta_1, \theta_2, \ldots, \theta_c$ may be selected by grouping the basic feature vectors into clusters. The representative feature vectors $\theta_1, \theta_2, \ldots, \theta_c$ may correspond to generalized users, and be also referred to as generalized feature vectors. In addition, the representative feature vectors $\theta_1, \theta_2, \ldots, \theta_c$ may be included as reference data in a generalized user model 640, and used for on-device training. For example, there may be tens or hundreds of such representative feature vectors. For example, the number of the representative feature vectors may be 1000 or less, 500 or less, or 100 or less. The representative feature vectors may correspond to data that a user device processes through deep learning or training actually or practically. For example, 10 utterances or speeches may be collected from each of approximately one hundred thousand of users, and a DB including approximately one million utterances or speeches may be configured. Based on the DB, approximately 100 representative feature vectors may be generated.

Figure 7:
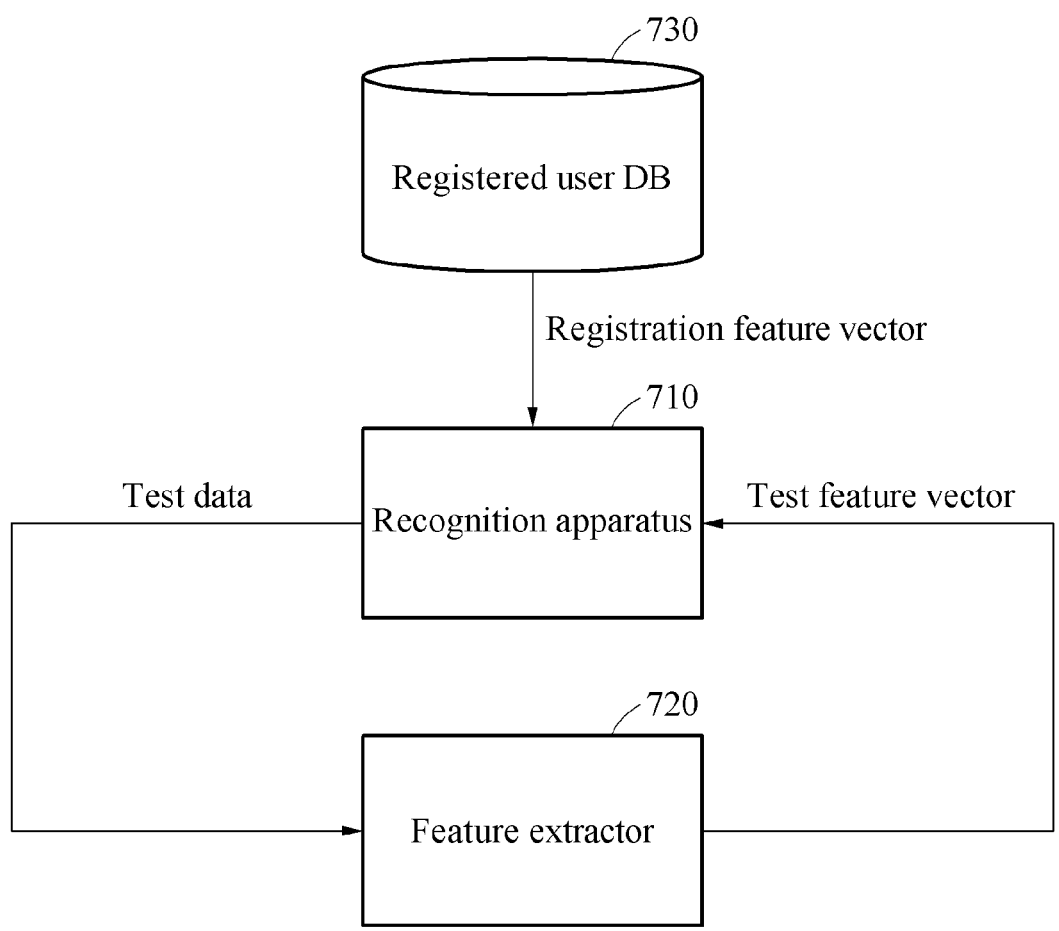
FIG. 7 is a diagram illustrating an example of an operation to be performed by a recognition apparatus for user recognition.

FIG. 7 is a diagram illustrating an example of an operation to be performed by a recognition apparatus for user recognition. Referring to FIG. 7, a recognition apparatus 710 inputs test data to a feature extractor 720. In the example of FIG. 7, the feature extractor 720 is in a state in which on-device training is completed. The feature extractor 720 outputs a test feature vector in response to the input of the test data. The test data may be input by a test user in a user verification process. The test user may be an unidentified person who attempts user recognition through the recognition apparatus 710 to use the recognition apparatus 710. The test user may be a valid user or an impostor.

The recognition apparatus 710 obtains a registration feature vector from a registered user DB 730, performs the user recognition on the test user by comparing the registration feature vector and the test feature vector, and generates a recognition result. For example, the recognition apparatus 710 determines a distance between the registration feature vector and the test feature vector, and generates the recognition result based on a result of comparing the determined distance and a threshold value. For example, the distance between the registration feature vector and the test feature vector may be determined based on a cosine distance and a Euclidean distance between the registration feature vector and the test feature vector.

FIGS. 8 and 9 are diagrams illustrating examples of a change in distribution of feature vectors based on on-device training. In the example of FIG. 8, registration feature vectors are indicated on vector planes 810 and 820. The registration feature vectors are indicated by small circles, and small circles with a same pattern indicate registration feature vectors of a same registered user. In the example, registration feature vectors on the vector plane 810 are obtained through a feature extractor to which on-device training is not applied yet, and registration feature vectors on the vector plane 820 are obtained through the feature extractor to which the on-device training is applied. As illustrated in FIG. 8, the registration feature vectors may be remapped to be specific to registered users through the on-device training. Thus, the registered users, for example, registered users having similar features, such as, for example, family members, may be more accurately identified from each other.

Referring to FIG. 9, vector planes 910 and 920 further include feature vectors of impostors, compared to the vector planes 810 and 820 illustrated in FIG. 8. In the example of FIG. 9, the feature vectors of the impostors are simply referred to as impostor feature vectors and indicated by hexagonal stars. In the example, registration feature vectors and impostor feature vectors on the vector plane 910 are obtained through a feature extractor to which on-device training is not applied yet, and registration feature vectors and impostor feature vectors on the vector plane 920 are obtained through the feature extractor to which the on-device training is applied. As illustrated in FIG. 9, the impostor feature vectors, in addition to the registration feature vectors, may be remapped to be specific to registered users through the on-device training. Thus, a registered user and an impostor may be more accurately identified or distinguished from each other, and thus the registered user may be more accurately verified.

Figure 10:
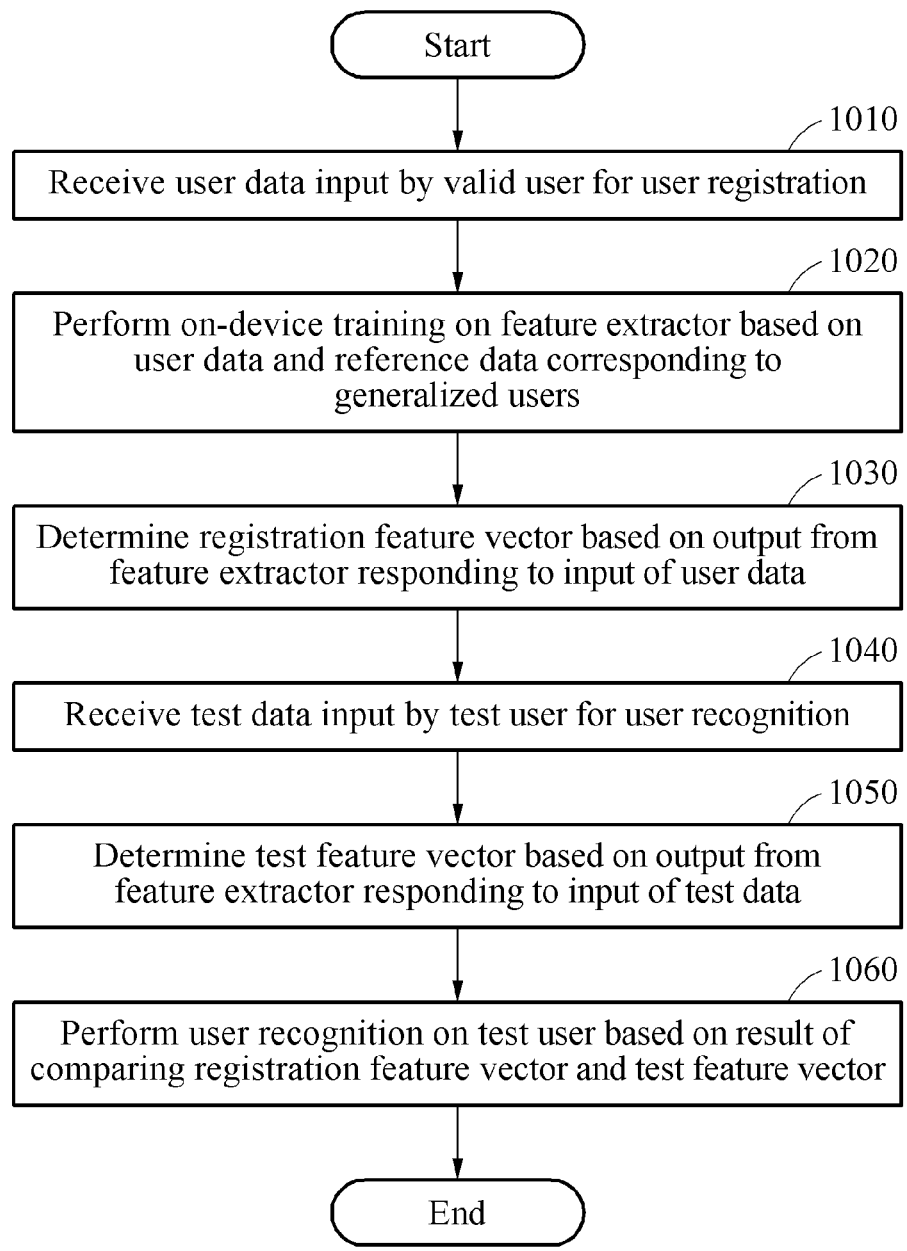
FIG. 10 is a flowchart illustrating an example of an on-device training-based recognition method.

FIG. 10 is a flowchart illustrating an example of an on-device training-based recognition method. Referring to FIG. 10, in operation 1010, a recognition apparatus receives user data input by a valid user for user registration. In operation 1020, the recognition apparatus performs on-device training on a feature extractor based on the user data and reference data corresponding to generalized users. In operation 1030, the recognition apparatus determines a registration feature vector based on an output from the feature extractor that responds to the input of the user data. In operation 1040, the recognition apparatus receives test data input by a test user for user recognition. In operation 1050, the recognition apparatus determines a test feature vector based on an output from the feature extractor that responds to the input of the test data. In operation 1060, the recognition apparatus performs the user recognition on the test user based on a result of comparing the registration feature vector and the test feature vector. For a more detailed description of the on-device training-based recognition method, reference may be made to the descriptions provided above with reference to FIGS. 1 through 9.

Figure 11:
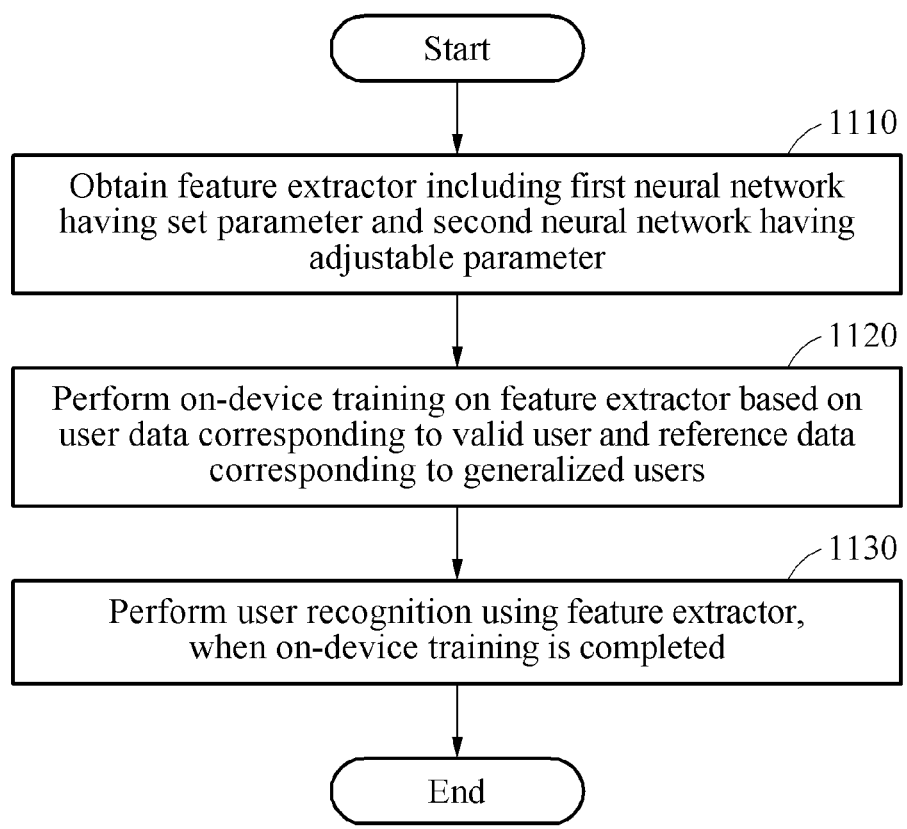
FIG. 11 is a flowchart illustrating another example of an on-device training-based recognition method.

FIG. 11 is a flowchart illustrating another example of an on-device training-based recognition method. Referring to FIG. 11, in operation 1110, a recognition apparatus obtains a feature extractor including a first neural network having a set parameter and a second neural network having an adjustable parameter. In operation 1120, the recognition apparatus performs on-device training on the feature extractor based on user data corresponding to a valid user and reference data corresponding to generalized users. In operation 1130, when the on-device training is completed, the recognition apparatus performs user recognition using the feature extractor. For a more detailed description of the on-device training-based recognition method, reference may be made to the descriptions provided above with reference to FIGS. 1 through 10.

Figure 12:
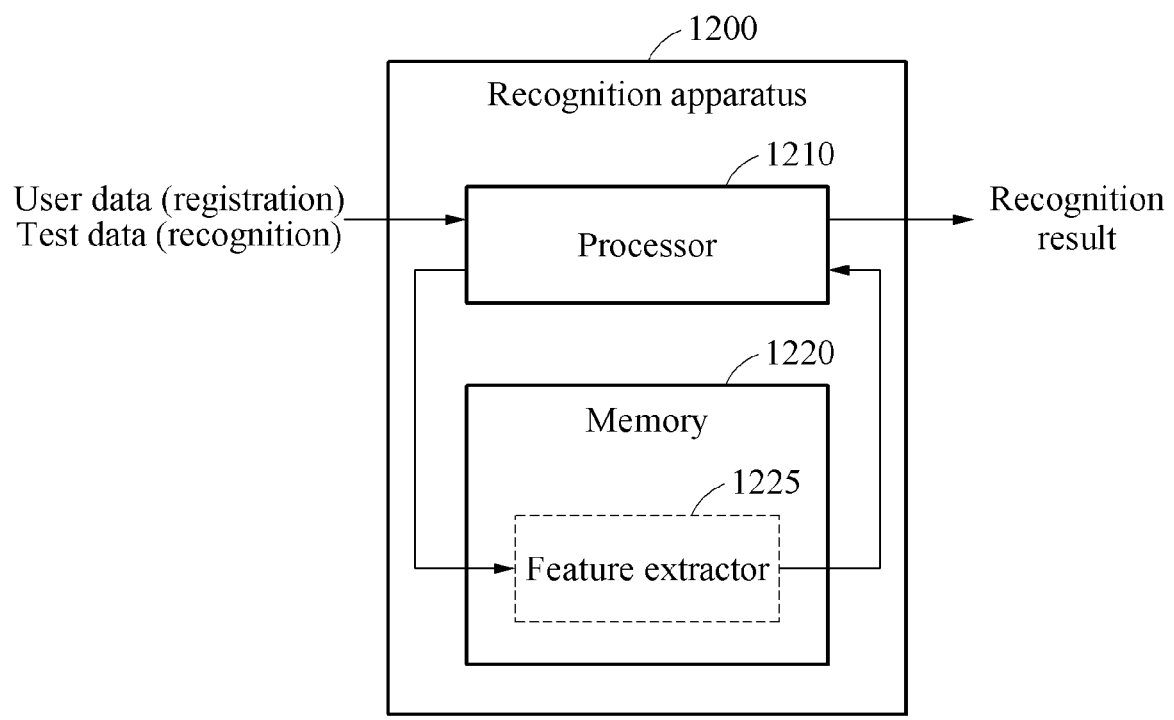
FIG. 12 is a diagram illustrating an example of an on-device training-based recognition apparatus.

FIG. 12 is a diagram illustrating an example of an on-device training-based recognition apparatus. A recognition apparatus 1200 may receive input data including user data and test data, and process an operation of a neural network associated with the received input data. The operation of the neural network may include user recognition, for example. The recognition apparatus 1200 may perform one or more, or all, of the operations or methods described herein in relation to processing the neural network, and provide a user with a result of processing the neural network.

Referring to FIG. 12, the recognition apparatus 1200 includes at least one processor 1210 and a memory 1220. The memory 1220 may be connected to the processor 1210, and store instructions executable by the processor 1210, and data to be processed by the processor 1210 or data processed by the processor 1210. The memory 1220 may include a non-transitory computer-readable medium, for example, a high-speed random-access memory (RAM), and/or a non-volatile computer-readable storage medium (e.g., at least one disk storage device, a flash memory device, and other nonvolatile solid-state memory devices).

The processor 1210 may execute instructions to perform one or more, or all, of the operations or methods described above with reference to FIGS. 1 through 11. In an example, when an instruction stored in the memory 1220 is executed by the processor 1210, the processor 1210 may receive user data input by a valid user for user registration, perform on-device training on a feature extractor 1225 based on the user data and reference data corresponding to generalized users, determine a registration feature vector based on an output from the feature extractor 1225 that responds to the input of the user data, receive test data input by a test user for user recognition, determine a test feature vector based on an output from the feature extractor 1225 that responds to the input of the test data, and perform the user recognition on the test user based on a result of comparing the registration feature vector and the test feature vector.

In another example, when an instruction stored in the memory 1220 is executed by the processor 1210, the processor 1210 may obtain the feature extractor 1225 including a first neural network having a set parameter and a second neural network having an adjustable parameter, perform on-device training on the feature extractor 1225 based on user data corresponding to a valid user and reference data corresponding to generalized users, and perform user recognition using the feature extractor 1225 when the on-device training is completed.

Figure 13:
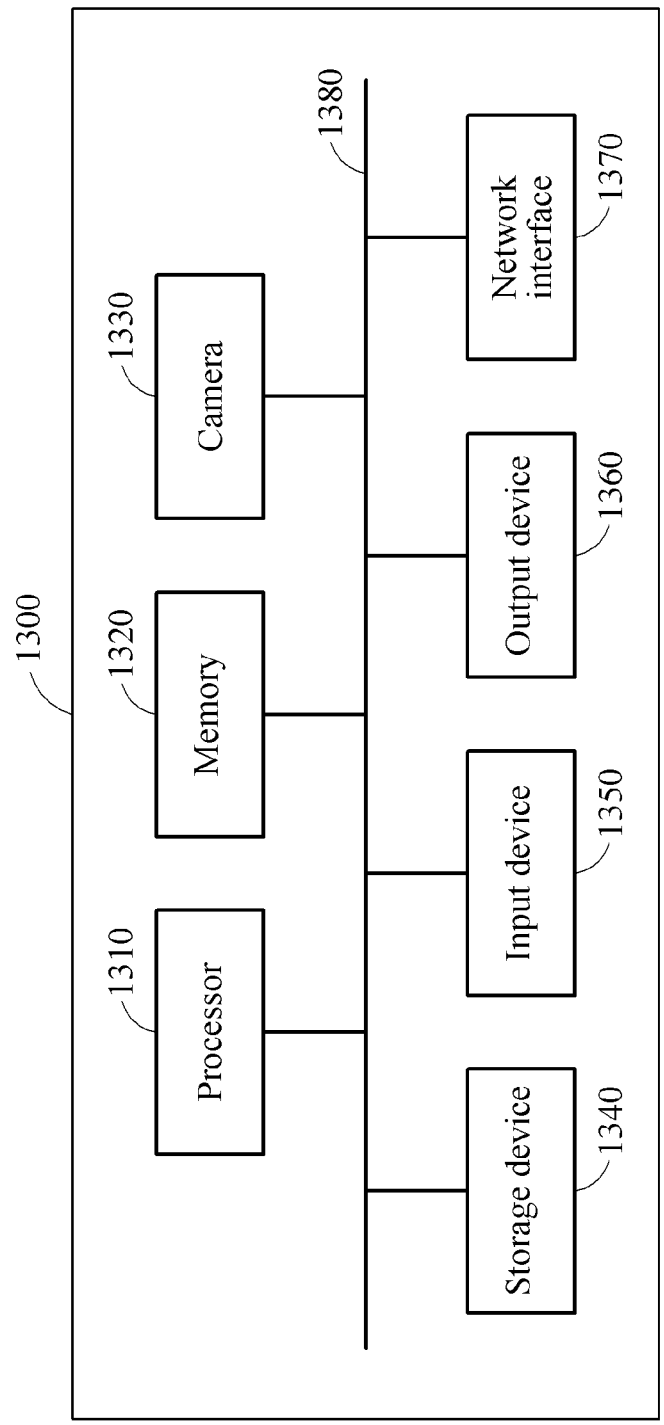
FIG. 13 is a diagram illustrating an example of a user device.

FIG. 13 is a diagram illustrating an example of a user device. A user device 1300 may receive input data, and process an operation of a neural network associated with the received input data. The operation of the neural network may include user recognition, for example. The user device 1300 may include the recognition apparatus described above with reference to FIGS. 1 through 12, and perform an operation or function of the recognition apparatus as described above with reference to FIGS. 1 through 12.

Referring to FIG. 13, the user device 1300 includes a processor 1310, a memory 1320, a camera 1330, a storage device 1340, an input device 1350, an output device 1360, and a network interface 1370. The processor 1310, the memory 1320, the camera 1330, the storage device 1340, the input device 1350, the output device 1360, and the network interface 1370 may communicate with one another through a communication bus 1380. The user device 1300 may include, for example, a smartphone, a tablet personal computer (PC), a laptop, a desktop, a wearable device, a smart home appliance, a smart speaker, a smart car, and the like.

The processor 1310 may execute a function and an instruction in the user device 1300. For example, the processor 1310 may process instructions stored in the memory 1320 or the storage device 1340. The processor 1310 may perform one or more, or all, of the operations or methods described above with reference to FIGS. 1 through 12.

The memory 1320 may store information to be used to process the operation of the neural network. The memory 1320 may include a computer-readable storage medium or a computer-readable storage device. The memory 1320 may store instructions to be executed by the processor 1310, and store related information while software or an application is being executed by the user device 1300.

The camera 1330 may capture a still image, a moving or video image, or both the images. The camera 1330 may capture an image of a face region to be input by a user for facial verification. The camera 1330 may also provide a three-dimensional (3D) image including depth information of objects.

The storage device 1340 may include a computer-readable storage medium or a computer-readable storage device. The storage device 1340 may store a greater amount of information for a longer period of time, compared to the memory 1320. The storage device 1340 may include, for example, a magnetic hard disk, an optical disc, a flash memory, a floppy disk, and other types of nonvolatile memory that are well-known in the related technical field.

The input device 1350 may receive an input from a user through a traditional input method, for example, a keyboard and a mouse, and a new input method, for example, a touch input, a voice input, and an image input. The input device 1350 may include, for example, a keyboard, a mouse, a touchscreen, a microphone, and other devices that may detect the input from the user and transmit the detected input to the user device 1300. Through the input device 1350, data of a fingerprint, an iris, a speech, a voice, and an audio of the user, and the like may be input.

The output device 1360 may provide an output from the user device 1300 to a user through a visual, auditory, or tactile channel. The output device 1360 may include, for example, a display, a touchscreen, a speaker, a vibration generator, and other devices that may provide the output to the user. The network interface 1370 may communicate with an external device through a wired or wireless network.

The recognition apparatus, training apparatus, the user device, and other apparatuses, devices, units, modules, and other components described herein with respect to FIGS. 1, 12, and 13 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A recognition method comprising:
   receiving user data input by a valid user for user registration;
   performing on-device training on a feature extractor based on the user data and reference data corresponding to generalized users;
   determining a registration feature vector based on an output from the feature extractor in response to input of the user data;
   receiving test data input by a test user for user recognition;
   determining a test feature vector based on an output from the feature extractor in response to input of the test data; and
   performing the user recognition on the test user based on a result of comparing the registration feature vector to the test feature vector,
   wherein the feature extractor includes a first neural network having a fixed parameter dependent on pretraining and a second neural network having an adjustable parameter dependent on the on-device training.

2. The recognition method of claim 1, wherein the wherein the adjustable parameter of the second neural network is adjusted by the on- device training.

3. The recognition method of claim 2, wherein the first neural network is pretrained to extract a feature from input data based on a large user database.

4. The recognition method of claim 1, wherein performing the on-device training comprises:
   allocating labels of different values to the user data and the reference data, respectively; and
   performing the on-device training based on a result of comparing the labels and outputs from the feature extractor in response to inputs of the user data and the reference data.

5. The method of claim 3, further comprising performing the pretraining of the first neural network by a device different from a device that performs the user recognition.

6. The recognition method of claim 1, wherein the reference data includes generalized feature vectors corresponding to the generalized users, and
   wherein the generalized feature vectors are generated by grouping feature vectors corresponding to a plurality of generalized users into clusters.

7. The recognition method of claim 1, wherein performing the user recognition comprises:
   performing the user recognition based on a result of comparing a distance between the registration feature vector and the test feature vector to a threshold value.

8. The recognition method of claim 7, wherein the distance between the registration feature vector and the test feature vector is determined based on one of a cosine distance between the registration feature vector and the test feature vector and an Euclidean distance between the registration feature vector and the test feature vector.

9. The recognition method of claim 1, further comprising:
   storing the determined registration feature vector in a registered user database.

10. A non-transitory computer-readable storage medium storing instructions that, when executed by a processor, cause the processor to perform the recognition method of claim 1.

11. A recognition apparatus comprising:
   a processor; and
   a memory including instructions executable in the processor, wherein, when the instructions are executed by the processor, the processor is configured to:
   receive user data input by a valid user for user registration;
   perform on-device training on a feature extractor based on the user data and reference data corresponding to generalized users;
   determine a registration feature vector based on an output from the feature extractor in response to the input of the user data;
   receive test data input by a test user for user recognition;
   determine a test feature vector based on an output from the feature extractor in response to the input of the test data; and
   perform the user recognition on the test user based on a result of comparing the registration feature vector to the test feature vector,
   wherein the feature extractor includes a first neural network having a fixed parameter dependent on pretraining and a second neural network having an adjustable parameter dependent on an on-device training.

12. The recognition apparatus of claim 11, wherein the adjustable parameter of the second neural network is adjusted by the on-device training.

13. The recognition apparatus of claim 12, wherein the first neural network is pretrained to extract a feature from input data based on a large user database.

14. The recognition apparatus of claim 11, wherein the processor is configured to:
   allocate labels of different values to the user data and the reference data, respectively; and
   perform the on-device training based on a result of comparing the labels and outputs from the feature extractor in response to inputs of the user data and the reference data.

15. The recognition apparatus of claim 11, wherein the processor is configured to:
   input the user data to the first neural network;
   input, to the second neural network, the reference data and an output from the first neural network in response to the input of the user data; and
   perform the on-device training based on an output from the second neural network.

16. The recognition apparatus of claim 11, wherein the reference data includes generated feature vectors corresponding to the generalized users, and
   wherein the generalized feature vectors are generated by grouping feature vectors corresponding to a plurality of generalized users into clusters.

17. The recognition apparatus of claim 11, wherein the processor is configured to:
   perform the user recognition based on a result of comparing a distance between the registration feature vector and the test feature vector to a threshold value.

18. The recognition apparatus of claim 17, wherein the distance between the registration feature vector and the test feature vector is determined based on one of a cosine distance between the registration feature vector and the test feature vector and an Euclidean distance between the registration feature vector and the test feature vector.

19. The recognition apparatus of claim 11, wherein the processor is configured to store the determined registration feature vector in a registered user database.

* * * * *